United States Patent [19]

Hedrick

[11] 4,339,943
[45] Jul. 20, 1982

[54] PRESSURE TRANSDUCER CROSS-CHECK SYSTEM

[75] Inventor: Geoffrey S. M. Hedrick, Malvern, Pa.

[73] Assignee: Smiths Industries Limited, London, England

[21] Appl. No.: 175,425

[22] Filed: Aug. 5, 1980

[51] Int. Cl.³ .............................................. G01L 27/00
[52] U.S. Cl. .................................... 73/4 R; 73/117.4; 73/178 R; 73/756
[58] Field of Search ............. 73/4 R, 115, 756, 178 R, 73/714, 117.4

[56] References Cited

U.S. PATENT DOCUMENTS

| | | | |
|---|---|---|---|
| 3,310,666 | 3/1967 | Millar et al. | 73/117.4 |
| 3,585,841 | 6/1971 | Brandau | 73/4 R |
| 3,835,701 | 9/1974 | Murphy | 73/117.4 |
| 3,837,220 | 9/1974 | McDonald | 73/117.4 |
| 3,852,741 | 12/1974 | McDonald | 73/117.4 |
| 3,886,790 | 6/1975 | Plett | 73/117.4 |
| 3,927,307 | 12/1975 | Reschak | 73/117.4 |
| 4,003,249 | 1/1977 | Laskody | 73/117.4 |
| 4,130,872 | 12/1978 | Harioff | 73/117.4 |

Primary Examiner—Donald O. Woodiel

Attorney, Agent, or Firm—Hubbell, Cohen, Stiefel & Gross

[57] ABSTRACT

A pressure transducer cross-check system (10) in which a pair of low precision pressure transducers (12, 14) which detect parameters related to each other in content are alternately periodically calibrated during the operation of the system by cross-checking by a solenoid actuated valve (18) which alternately connects one of the pair of low precision pressure transducers (12, 14) to its associated pressure input (20, 22) while connecting a common high precision pressure transducer (16) to the other of the related pressure parameter inputs (20, 22) for selectively alternately providing one of the pair of parameter input signals as a high precision pressure responsive input signal to the system controller on alternate cycles of the low precision pressure transducer pair in accordance with the cycling of the valve (18). The high precision pressure transducer (16) output signal and the alternately selected low precision pressure transducer (12, 14) output signal are compared under identical sampling conditions, such as by conversion of the low precision pressure transducer voltage output into a frequency output via a voltage-to-frequency converter (32) where the high precision pressure transducer (16) output is a signal in which the frequency is proportional to pressure.

20 Claims, 2 Drawing Figures

PRESSURE TRANSDUCER CROSS-CHECK SYSTEM

TECHNICAL FIELD

This invention relates to systems for cross-checking pressure transducers, such as in an aircraft instrument system, such as an engine pressure ratio transmitter, and particularly to such a system in which a pair of low precision pressure transducers can be cross-checked by a common high precision pressure transducer on alternate input cycles to a system controller.

The system of the present invention may advantageously be utilized when there is a large ratio, such a 100:1 or better, between the linearity of the high precision pressure transducer and that of the lower precision pressure transducer, such as when a quartz beam type of pressure transducer is employed as the high precision pressure transducer and a strain gauge type of pressure transducer is employed for each of the low precision pressure transducers. In such an instance the voltage output of the strain gauge type of pressure transducer is converted by means of a voltage-to-frequency converter into a signal in which the frequency is proportional to the pressure, which is the format of the type of signal normally available from a quartz beam type of pressure transducer, so that the fold-back effect may be minimized when the high precision pressure transducer is employed to calibrate each of the low precision pressure transducers during the aforementioned alternate input cycles.

BACKGROUND ART

Pressure responsive aircraft instrumentation such as altimeters, air speed indicators, and engine pressure ratio or EPR indicators are well known in the art. Examples of such prior art engine pressure ratio indicators are disclosed in U.S. Pat. Nos. 4,003,249; 3,852,741; 3,310,666 and 3,927,307. All of these types of prior art instruments normally employ pressure transducers to measure or detect a desired pressure responsive parameter. For example, in such prior art instruments for determining mach, one pressure transducer is employed to detect the total pressure while another pressure transducer is employed to detect the static pitot pressure, with the measured difference b normally being utilized to obtain $q_c$ via a conventional onboard air data computer. Similarly, in the case of prior art engine pressure ratio indicators, one pressure transducer is employed to detect or measure the numerator component of the engine pressure ratio while another pressure transducer is employed to measure the denominator component of the engine pressure ratio. This information is then normally provided to an onboard air data computer to determine the appropriate EPR indication and display it to the pilot, such as disclosed in U.S. Pat. Nos. 3,886,790; 3,837,220; 4,130,872 and 3,835,701. Because of the required accuracy of the aircraft instrumentation employing pressure transducers, whether they be EPR indicators, altimeters or other instrumentation, costly high precision pressure transducers have been employed for each of the required pressure transducers. Moreover, because such instrumentation normally employs several pressure transducers, the cost of such instrumentation has risen considerably. Even with the use of such high precision pressure transducers, errors have still occurred due to such factors as spurious forces or conditions. Thus, the prior art has attempted to provide apparatus that insures that all of the pressure sensitive devices employed in the instrumentation respond identically to spurious forces. An example of such a prior art attempt is disclosed in U.S. Pat. No. 2,866,332 in which a third pressure transducer is employed in addition to the normal transducer pair of an EPR transmitter in order to continuously compensate for errors introduced into the EPR transmitter by the normal pressure transducer pair, such as due to spurious forces or conditions. This is accomplished in the above prior art system by simultaneously applying the combined output associated with all three transducers to the indicator circuitry. The prior art system, however, while compensating for certain errors, still does not avoid the prior art requirement for high precision pressure transducers. These problems are overcome by the present invention in which a pair of low quality pressure transducer is cross-checked by a valving system with a common high precision pressure transducer during alternate cycles of input of the pressure responsive parameters detected or measured by the low precision pressure transducer pair.

DISCLOSURE OF THE INVENTION

In accordance with the present invention, an aircraft instrument system capable of receiving a pair of content related pressure responsive signals for providing input signals based thereon to a controller for the system, which controller is capable of providing an aircraft instrument control signal responsive to the input signals provided thereto, is provided in which a pair of low precision pressure transducers are alternatively calibrated periodically during the operation of the aircraft instrument system dependent on a common high precision pressure responsive input signal provided from a common high precision pressure transducer, with the cross-checking or alternate calibration being accomplished via a valving system, such as a solenoid actuated valve. Each of the pair of low precision pressure transducers is connected to a different parameter input for providing a pressure responsive parameter signal to the system controller, such as a conventional air data computer, in accordance with the detected parameter. The common high precision pressure transducer is selectively operatively connected between the system controller and one of the pair of parameter inputs. The valve, which is operatively connected between the pair of parameter inputs, the pair of low precision pressure transducers and the common high precision pressure transducer, alternately connects one of the pair of low precision pressure transducers to one of the parameter inputs while connecting the common high precision pressure transducer to the other of the parameter inputs for selectively alternately providing one of the pair of parameter input signals as a high precision pressure responsive input signal to the system controller on alternate cycles of the low precision pressure transducer pair in accordance with the cycling of the valve. Such an arrangement may advantageously be employed in an engine pressure ratio transmitter, such as one in which the ratio in linearity between the high precision pressure transducer and the low precision pressure transducer is on the order of at least 100:1. This may be accomplished by employing a conventional quartz beam pressure transducer as the high precision pressure transducer and a conventional strain gauge pressure type of transducer as the low precision pressure transducer. However, in the above instance, it is preferred that a voltage-to-frequency converter be employed in connection with the output of the low precision strain gauge type of pressure transducer so as to convert the DC voltage output into a pressure responsive signal in which the frequency is proportional to the pressure since this is the type of signal that is normally provided as the output of a high precision quartz beam type of pressure transducer. In this manner, aliasing or fold-back effect may be minimized by the system controller, such as the aforementioned air data computer, when calibrating the low precision pressure transducer signal output in accordance with the high precision pressure transducer signal output.

In the presently preferred system, the conventional onboard air data computer receives information on the other low precision pressure transducer while it is being calibrated so that the computer can determine whether or not to vary the sampling rate which, by way of example, may preferably be varied if the variation in measured or detected value by this low precision pressure transducer is greater than 1% between readings. In such an instance, the cycling rate of the solenoid actuated valve controlled by the computer would preferably be varied.

BEST MODE FOR CARRYING OUT THE INVENTION

Figure 1:
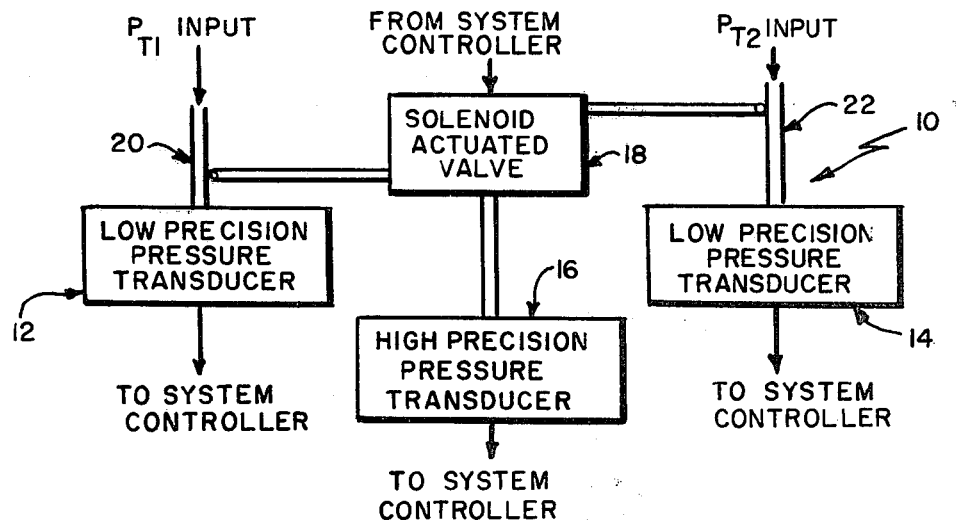
FIG. 1 is a diagrammatic illustration, partially in block, of the pressure transducer cross-check system of the present invention.

Referring now to the drawings in detail and initially to FIG. 1 thereof, a diagrammatic illustration of the principle of operation of the pressure transducer cross-check system, generally referred to by reference numeral 10, of the present invention is shown. As shown and preferred in FIG. 1, the pressure transducer cross-check system 10 of the present invention preferably includes a pair of low precision pressure transducers 12 and 14, respectively, such as conventional strain gauge type of pressure transducers, such as ones having approximately 0.5% linearlity, and a common high precision pressure transducer 16, such as a conventional quartz beam type of pressure transducer, such as a Paroscientific 230A, all of which have their pressure inputs tied together via a conventional solenoid actuated valve 18 which is controlled by the system controller, such as a conventional onboard air data computer (not shown) in the instance of an aircraft instrument system, such as an EPR indicator. The high precision pressure transducer 16 may preferably have a linearity on the order of magnitude of substantially 0.005% so that the ratio in linearity between the high precision pressure transducer 16 and either of the low precision pressure transducers 12 or 14 is preferably on the order of 100:1 or better. As further shown and preferred in FIG. 1, a pressure parameter input tube 20 provides one pressure parameter input to the low precision pressure transducer 12 and another similar pressure parameter input tube 22 provides a pressure parameter input to the other low precision pressure transducer 14. In the instance of an EPR indicator, these respective pressure parameter inputs may be the numerator and denominator of the EPR ratio, such as, by way of example, $P_{T2}$ and $P_{T7}$, respectively.

The solenoid actuated valve 18 is preferably conventionally controlled by the conventional onboard air data computer which receives the output signals from the pressure transducers 12, 14, and 16. The air data computer provides a control signal to shift solenoid actuated valve 18 to enable the output of low precision pressure transducer 12 to be measured while the high precision pressure transducer 16 independently and simultaneously measures the same pressure parameter input of input tube 20 to determine a correction factor for the low pressure transducer 12. At the same time, the other pressure parameter input to the system is the low precision pressure transducer 14 output provided from the detection or measurement of the pressure parameter associated with input tube 22. During the next cycle, the solenoid actuated valve 18 is again shifted by the onboard air data computer so that the common high precision pressure transducer 16 detects or measures the pressure parameter input from tube 22 independently and simultaneously with the measurement of this input by low precision pressure transducer 14 so as to determine a correction factor for low precision pressure transducer 14. As in the previous cycle, the other pressure parameter input to the system, which in this instance is provided by low precision pressure transducer 12, is provided at the same time. In this manner, each of the low precision pressure transducers 12 and 14 is alternately periodically calibrated by the common high precision pressure transducer 16, as will be described in greater detail hereinafter. Thus, the correction factor obtained by the pressure transducer cross-check system 10 of the present invention may be described as the output of the high precision pressure transducer 16 divided by the output of the low precision pressure transducer 12 or 14 being calibrated, with the corrected pressure responsive output signal being defined as the output of the particular low precision pressure transducer 12 or 14 multiplied by the above correction factor for that low precision pressure transducer 12 or 14. If desired, the slope of a curve which can be obtained over a periodic sampling interval for these parameters may be used as the correction factor instead of the above correction factor in accordance with conventional methods, such as the least squares fit or a second order polynomial curve fit. The aforementioned solenoid actuated valve 18 is preferably a hydraulic quality such as one having teflon seals which is actuated under the control, preferably, of the onboard air data computer (not shown) so as to cycle or alternate preferably every two seconds to five seconds if desired. This cycling rate may preferably be overridden to recheck the same pressure parameter if that pressure parameter varies by greater than a predetermined percentage, such as preferably 1%, over the previous reading, to a maximum cycling rate of preferably on the order of 0.1 seconds. Thus, the conventional onboard air data computer preferably receives information on one pressure transducer, such pressure transducer 12, while the other pressure transducer, such as pressure transducer 14, is being calibrated, and vice versa, so that in accordance with this information, the onboard air data computer may determine whether to vary the sampling or cycling rate of solenoid actuator valve 18 as described above.

It should be noted that preferably the parameters detected by the pair of low precision pressure transducers 12 and 14 are related to each other in content, such as the numerator and denominator of the conventional EPR ratio or the total pressure and static pitot pressure employed to obtain $q_c$. Thus, as described above, a pair of low precision pressure transducers 12 and 14 may be cross-checked in accordance with the operation of solenoid actuator valve 18 by means of a common high precision pressure transducer 16.

Figure 2:
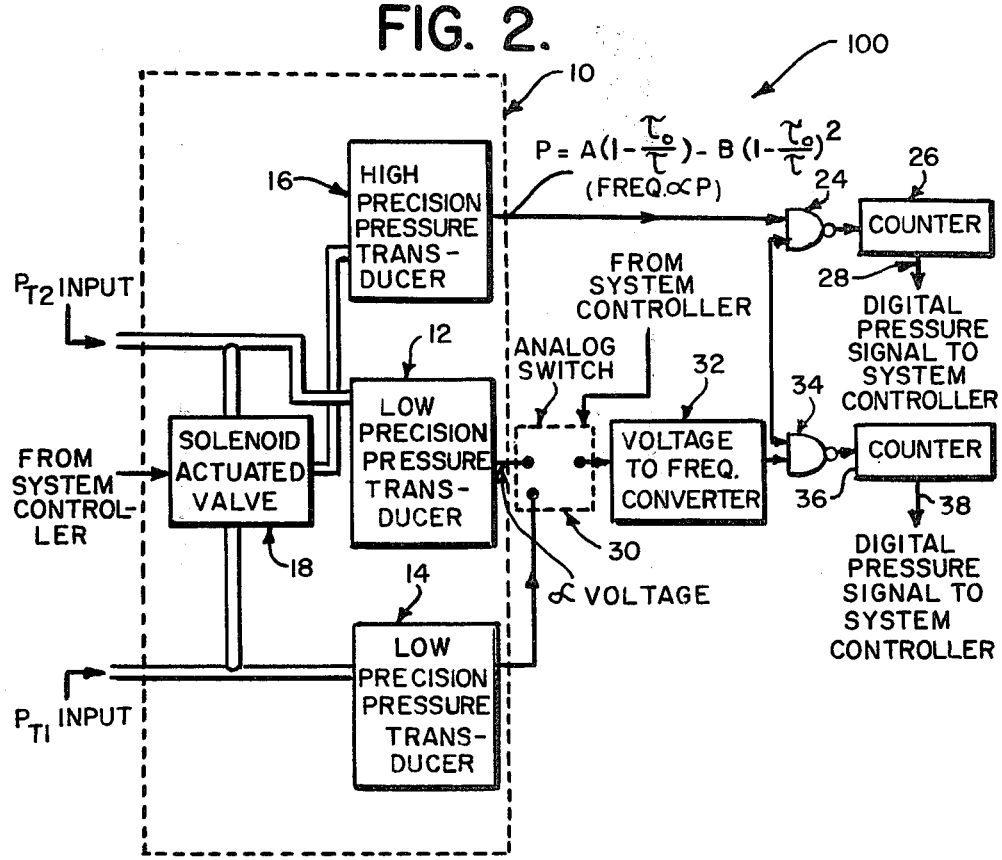
FIG. 2 is a block diagram of a preferred pressure transducer cross-check system in accordance with the present invention employed in an engine pressure ratio indicator aircraft instrument system, by way of example.

Referring now to FIG. 2, a presently preferred embodiment of the pressure transducer cross-check system 10 of the present invention, such as for use in an EPR indicator, is shown. The overall system of FIG. 2, generally referred to by the reference numeral 100, preferably includes, in addition to the previously described arrangement of the solenoid actuated valve 18, low precision pressure transducers 12 and 14, and high precision pressure transducer 16, a means for converting the signals into digital pressure responsive input signals to be provided to the system controller or conventional onboard air data computer which is preferably a digital computer (not shown). Thus, assuming the common high precision pressure transducer 16 is a conventional type of quartz beam pressure transducer, such as the type commercially available under the designation Paroscientific 230A, the output of this high precision pressure transducer 16 is a signal in which the frequency is proportional to the pressure, with this pressure being represented by the expression $P = A(1 - \tau_0 \div \tau) - B(1 - \tau_0 \div \tau)^2$, where A and B are calibration constants, $\tau_0$ is the period of the quartz beam oscillator 16 at zero pressure and $\tau$ is the period of the quartz beam oscillator 16 at the measured pressure. This output signal is preferably provided as the gating signal to a conventional logic gate 24 whose pulse output is, in turn, provided to the input of a conventional pulse counter 26 which is incremented thereby in conventional fashion to provide a digital pressure responsive signal input to the system controller onboard air data computer via path 28. On the other hand, the low precision pressure transducer output signal obtained directly either from pressure transducer 12 or pressure transducer 14, in the instance where a conventional type of strain gauge pressure transducer is employed, is a DC voltage signal which is proportional to pressure rather than one in which the frequency is proportional to the pressure. Accordingly, this DC voltage output signal is preferably provided to a conventional computer controlled analog switch 30 which is preferably conventionally controlled by the system controller or onboard air data computer in conjunction with the control of the solenoid actuated valve 18 to select between the output of low precision pressure transducer 12 and the output of low precision pressure transducer 14, and therefrom to a conventional voltage-to-frequency converter 32, such as one conventionally available under the designation Fairchild 9401, which conventionally converts this DC voltage output from the selected low precision pressure transducer 12 or 14 into a signal in which the frequency is proportional to the pressure. Thus the format of the output of the selected low precision pressure transducer 12 or 14 and of the high precision pressure transducer 16 are preferably made identical so as to permit comparison of the low precision pressure transducer 12 or 14 output with the output of the high precision pressure transducer 16 under identical sampling conditions and thereby minimize aliasing or fold-back effect. This reformatted low precision pressure transducer output signal is then applied to another conventional logic gate 34 which, in turn, also provides a pulse input to a conventional pulse counter 36 which is incremented thereby in conventional fashion to provide a separate digital pressure responsive input signal to the system controller or onboard air data computer via path 38. Thus, the low precision pressure transducers 12 and 14 in the system of FIG. 2 are cross-checked by high precision pressure transducer 16 in conjunction with the operation of the solenoid actuated valve 18 under identical sampling conditions thereby minimizing potential error factors while saving, at the very least, a minimum of one costly high precision pressure transducer without sacrificing any of the accuracy inherent in such high precision pressure transducers.

What is claimed is:

1. In an aircraft instrument system capable of receiving a pair of content related pressure responsive signals for providing input signals based thereon to a controller for said system, said system controller being capable of providing an aircraft instrument control signal responsive to said input signals provided thereto; the improvement comprising a pair of parameter input means; a pair of pressure transducers operatively connected between said parameter input means and said system controller, each of said pressure transducers being connected to a different parameter input means of said pair and being capable of detecting a predetermined parameter associated with said parameter input means for providing a pressure responsive parameter signal to said system controller in accordance with said detected parameter, said detected parameters being related to each other in content whereby said pair of provided parameter signals are related to each other in content, said pair of pressure transducers being operatively connected to said system controller for selectively providing said related parameter signals as said input signals thereto, each of said pair of pressure transducers being a relatively low precision pressure transducer; a common relatively high precision pressure transducer as compared with said low precision pressure transducers, said common high precision pressure transducer being selectively operatively connected between said system controller and one of said pair of parameter input means; and valve means operatively connected between said pair of parameter input means, said pair of low precision pressure transducers and said common high precision pressure transducer for alternately connecting one of said pair of low precision pressure transducers to one of said parameter input means while connecting said common high precision pressure transducer to the other of said parameter input means for selectively alternately providing one of said pair of parameter input signals as a high precision pressure responsive input signal to said system controller on alternate cycles of said low precision pressure transducer pair in accordance with the cycling of said valve means, whereby each of said low precision pressure transducers is alternately periodically calibrated during the operation of said aircraft instrument system dependent on said common high precision pressure responsive input signal.

2. An aircraft instrument system in accordance with claim 1 wherein said system comprises an engine pressure ratio transmitter.

3. An aircraft instrument system in accordance with claim 2 wherein one of said parameter input means enables detection of $P_{T2}$ and the other of said parameter input means enable detection of $P_{T7}$.

4. An aircraft instrument system in accordance with claim 1 wherein said valve means is operatively connected to said system controller for control thereby.

5. An aircraft instrument system in accordance with claim 1 wherein said valve means is a solenoid actuated valve.

6. An aircraft instrument system in accordance with claim 1 wherein said valve means is a hydraulic quality valve.

7. An aircraft instrument system in accordance with claim 1 further comprising means operatively connecting said pair of low precision pressure transducers to said parameter input means and said system controller for additionally providing said low precision pressure responsive input signal from the other of said parameter input means to said system controller for detecting a rate of variation in said detected parameter associated with said other of said parameter input means whereby the cycling rate of said valve means may be varied in accordance therewith.

8. An aircraft instrument system in accordance with claim 1 wherein said low precision pressure transducer has a linearity of substantially 0.5%.

9. An aircraft instrument system in accordance with claim 8 wherein said high precision pressure transducer has a linearity of substantially 0.005%.

10. An aircraft instrument system in accordance with claim 1 wherein said high precision pressure transducer has a linearity of substantially 0.005%.

11. An aircraft instrument system in accordance with claim 1 wherein the ratio of linearity between said high precision pressure transducer and said low precision pressure transducer is at least substantially 100:1.

12. An aircraft instrument system in accordance with claim 11 wherein said system comprises an engine pressure ratio transmitter.

13. An aircraft instrument system in accordance with claim 1 wherein said high precision pressure transducer is a quartz beam type of pressure transducer.

14. An aircraft instrument system in accordance with claim 3 wherein said low precision pressure transducer is a strain gauge type of pressure transducer.

15. An aircraft instrument system in accordance with claim 1 wherein said low precision pressure transducer is a strain gauge type of pressure transducer.

16. An aircraft instrument system in accordance with claim 15 wherein said high precision pressure transducer means comprises means for providing a pressure responsive parameter signal proportional to frequency, said system further comprising means for converting the output of said strain gauge type of pressure transducer into a pressure responsive parameter signal proportional to frequency, whereby fold-back effect is minimized.

17. An aircraft instrument system in accordance with claim 16 wherein said high precision pressure transducer is a quartz beam type of pressure transducer.

18. An aircraft instrument system in accordance with claim 16 wherein further comprising means operatively connecting said pair of low precision pressure transducers to said parameter input means and said system controller for additionally providing said low precision pressure responsive input signal from the other of said parameter input means to said system controller for detecting a rate of variation in said detected parameter associated with said other of said parameter input means whereby the cycling rate of said valve means may be varied in accordance therewith.

19. In an instrument system capable of receiving a pair of content related pressure responsive signals for providing input signals based thereon to a controller for said system; the improvement comprising a pair of parameter input means; a pair of pressure transducers operatively connected between said parameter input means and said system controller, each of said pressure transducers being connected to a different parameter input means of said pair and being capable of detecting a predetermined parameter associated with said parameter input means for providing a pressure responsive parameter signal to said system controller in accordance with said detected parameter, said detected parameters being related to each other in content whereby said pair of provided parameter signals are related to each other in content, said pair of pressure transducers being operatively connected to said system controller for selectively providing said related parameter signals as said input signals thereto, each of said pair of pressure transducers being a relatively low precision pressure transducer; a common relatively high precision pressure transducer as compared with said low precision pressure transducers, said common high precision pressure transducer being selectively operatively connected between said system controller and one of said pair of parameter input means; and valve means operatively connected between said pair of parameter input means, said pair of low precision pressure transducers and said common high precision pressure transducer for alternately connecting one of said pair of low precision pressure transducers to one of said parameter input means while connecting said common high precision pressure transducer to the other of said parameter input means for selectively alternately providing one of said pair of parameter input signals as a high precision pressure responsive input signal to said system controller on alternate cycles of said low precision pressure transducer pair in accordance with the cycling of said valve means, whereby each of said low precision pressure transducers is alternately periodically calibrated during the operation of said instrument system dependent on said common high precision pressure responsive input signal.

20. An instrument system in accordance with claim 19 wherein the ratio of linearity between said high precision pressure transducer and said low precision pressure transducer is at least substantially 100:1.

* * * * *